(12) United States Patent
Dong et al.

(10) Patent No.: US 9,977,651 B2
(45) Date of Patent: May 22, 2018

(54) MOBILE TERMINAL AND IMAGE PROCESSING METHOD THEREOF

(71) Applicant: TENCENT TECHNOLOGY (SHENZHEN) COMPANY LIMITED, Shenzhen (CN)

(72) Inventors: Liqian Dong, Shenzhen (CN); Qisong Liu, Shenzhen (CN); Wenbing Ge, Shenzhen (CN); Yucun Pan, Shenzhen (CN); Xiaoyi Li, Shenzhen (CN); Qianwei Bian, Shenzhen (CN); Dan Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 374 days.

(21) Appl. No.: 14/683,309

(22) Filed: Apr. 10, 2015

(65) Prior Publication Data

US 2015/0212793 A1 Jul. 30, 2015

Related U.S. Application Data

(63) Continuation of application No. PCT/CN2013/082071, filed on Aug. 22, 2013.

(30) Foreign Application Priority Data

Oct. 17, 2012 (CN) .......................... 2012 1 0393870

(51) Int. Cl.
*G06F 3/16* (2006.01)
*G06F 3/01* (2006.01)
(Continued)

(52) U.S. Cl.
CPC .............. *G06F 3/167* (2013.01); *G06F 3/011* (2013.01); *G06F 3/04845* (2013.01); *G06T 11/00* (2013.01)

(58) Field of Classification Search
CPC ...... G06F 3/167; G06F 3/011; G06F 3/04845; G06T 11/00
See application file for complete search history.

(56) References Cited

U.S. PATENT DOCUMENTS

2004/0167777 A1* 8/2004 Hetherington ...... G10L 21/0208
704/226
2006/0178213 A1* 8/2006 Ohta ..................... A63F 13/215
463/37

(Continued)

FOREIGN PATENT DOCUMENTS

| CN | 102012773 A | 4/2011 |
|---|---|---|
| CN | 102148892 A | 8/2011 |

(Continued)

OTHER PUBLICATIONS

The State Intellectual Property Office of the People's Republic of China (SIPO) Office Action 1 for 201210393870.0 dated Aug. 29, 2016 pp. 1-8.

(Continued)

*Primary Examiner* — Sonia Gay
(74) *Attorney, Agent, or Firm* — Anova Law Group, PLLC

(57) ABSTRACT

The present disclosure discloses an image processing method of a mobile terminal, and a mobile terminal. To process an image, an audio signal is collected using a sensor of the mobile terminal. Air-blowing signal intensity is acquired by performing a windowed fast Fourier transform (FFT) on the audio signal to obtain a frequency domain signal of the audio signal. The frequency domain signal of the audio signal is divided into at least one time-slice frequency domain signal. It is then identified whether the audio signal is an air-blowing signal according to the at least one time-slice frequency domain signal and a preset property of the air-blowing signal. The air-blowing signal inten- (Continued)

sity is acquired according to the at least one time-slice frequency domain signal when the audio signal is identified as an air-blowing signal. An image is acquired according to the air-blowing signal intensity. In this manner, the image processing method using the air-blowing signal intensity may provide improved processing efficiency and simplified operation.

17 Claims, 4 Drawing Sheets

(51) Int. Cl.
  *G06F 3/0484* (2013.01)
  *G06F 11/00* (2006.01)
  *G06T 11/00* (2006.01)

(56) References Cited

U.S. PATENT DOCUMENTS

| | | | | |
|---|---|---|---|---|
| 2009/0019936 A1* | 1/2009 | Attia | ............... | G01H 3/08 73/659 |
| 2010/0185945 A1* | 7/2010 | Yang | ............... | H04M 1/72569 715/700 |
| 2010/0210332 A1* | 8/2010 | Imai | ............... | A63F 13/10 463/7 |
| 2010/0227640 A1 | 9/2010 | Kim et al. | | |
| 2011/0299692 A1* | 12/2011 | Rung | ............... | H04R 25/70 381/60 |
| 2012/0192121 A1* | 7/2012 | Bonnat | ............... | G06F 3/0488 715/863 |
| 2012/0288116 A1* | 11/2012 | Saito | ............... | H04R 3/00 381/94.2 |

FOREIGN PATENT DOCUMENTS

| | | |
|---|---|---|
| CN | 201985993 U | 9/2011 |
| CN | 201995017 U | 9/2011 |
| CN | 102523347 A | 6/2012 |
| CN | 102608931 A | 7/2012 |
| CN | 102668391 A | 9/2012 |
| CN | 102609092 A | 7/2015 |

OTHER PUBLICATIONS

The World Intellectual Property Organization (WIPO) International Search Report for PCT/CN2013/082071 dated Nov. 21, 2013.

* cited by examiner

MOBILE TERMINAL AND IMAGE PROCESSING METHOD THEREOF

RELATED APPLICATION

This application is a continuation of PCT Application No. PCT/CN2013/082071, filed on Aug. 22, 2013, which claims priority to Chinese Patent Application No. 201210393870.0, entitled "IMAGE PROCESSING METHOD OF MOBILE TERMINAL, AND MOBILE TERMINAL" filed with the Chinese Patent Office on Oct. 17, 2012, all of which are incorporated by reference in their entirety.

FIELD OF THE TECHNOLOGY

The present disclosure generally relates to the field of mobile terminals, and in particular, relates to an image processing method of a mobile terminal, and a mobile terminal.

BACKGROUND OF THE DISCLOSURE

In the existing technology, almost all image processing tools use a mouse or a touchpad to complete operations. For example, in a personal computer (PC), a user may process an image with the aid of an image processing tool such as Photoshop or Meituxiuxiu by using a mouse; and in a mobile terminal, a user may complete processing on an image with the aid of an existing image processing tool by using a touchpad. Existing image processing tools applicable to a mobile terminal may include, for example, a Meituxiuxiu iPhone version or a Meituxiuxiu Android version, and a Photowonder iPhone version or a Photowonder Android version.

Problems arise, however, conventional image processing methods require an overly-monotonous interaction, and a user must use manually controlled mouse or touchpad to process an image, which results in low processing efficiency and high operation complexity.

SUMMARY

To solve the problem in the existing technology, embodiments of the present invention provide an image processing method of a mobile terminal, and a mobile terminal. The technical solutions are as follows.

According to an aspect, an image processing method of a mobile terminal is provided, where the method includes: collecting an audio signal using a sensor of the mobile terminal; performing windowed fast Fourier transform (FFT) on the audio signal to obtain a frequency domain signal of the audio signal; dividing the frequency domain signal of the audio signal into at least one time-slice frequency domain signal; identifying whether the audio signal is an air-blowing signal according to the at least one time-slice frequency domain signal and a preset property of the air-blowing signal; and acquiring an air-blowing signal intensity according to the at least one time-slice frequency domain signal when the audio signal is identified as an air-blowing signal; and processing an image according to the air-blowing signal intensity.

According to another aspect, a mobile terminal is provided, where the mobile terminal includes: a sensor module, configured to collect an audio signal; an acquiring module, configured to acquire an air-blowing signal intensity according to the collected audio signal; and a processing module, configured to process an image according to the air-blowing signal intensity. The acquiring module includes a processing unit, configured to perform windowed fast Fourier transform (FFT) on the audio signal to obtain a frequency domain signal of the audio signal; a division unit, configured to divide the frequency domain signal of the audio signal into at least one time-slice frequency domain signal; an identification unit, configured to identify whether the audio signal is an air-blowing signal according to the at least one time-slice frequency domain signal and a preset property of the air-blowing signal; and an acquiring unit, configured to acquire the air-blowing signal intensity according to the at least one time-slice frequency domain signal when the audio signal is identified as an air-blowing signal.

According to another aspect, a non-transitory computer readable storage medium is provided to have one or more programs stored thereon. The one or more programs cause one or more processors of a terminal device to execute an image processing method. In the method, an audio signal is collected using a sensor of the mobile terminal. A windowed fast Fourier transform (FFT) performed on the audio signal to obtain a frequency domain signal of the audio signal. The frequency domain signal of the audio signal is divided into at least one time-slice frequency domain signal. It is identified whether the audio signal is an air-blowing signal according to the at least one time-slice frequency domain signal and a preset property of the air-blowing signal. An air-blowing signal intensity is acquired according to the at least one time-slice frequency domain signal when the audio signal is identified as an air-blowing signal. An image is processed according to the air-blowing signal intensity.

In the image processing method of a mobile terminal, and the mobile terminal provided in the embodiments of the present invention, an audio signal is collected using a sensor of the mobile terminal, air-blowing signal intensity is acquired according to the collected audio signal, and an image is processed according to the air-blowing signal intensity. By using the technical solutions of the embodiments of the present invention, the image can be processed according to the air-blowing signal intensity, and defects of an image processing manner in the existing technology that the processing efficiency is low and the operation complexity is high can be effectively overcome.

In the technical solutions of the embodiments of the present invention, a user is not required to process an image by manually controlling a mouse or a touchpad and can process the image only by blowing air, which provides a new image processing solution, thereby effectively improving the image processing efficiency and reducing the operation complexity.

Other aspects or embodiments of the present disclosure can be understood by those skilled in the art in light of the description, the claims, and the drawings of the present disclosure.

BRIEF DESCRIPTION OF THE DRAWINGS

To describe the technical solutions in embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure more comprehensible, the following further describes the embodiments of the present invention in detail with reference to the accompanying drawings.

Figure 1:
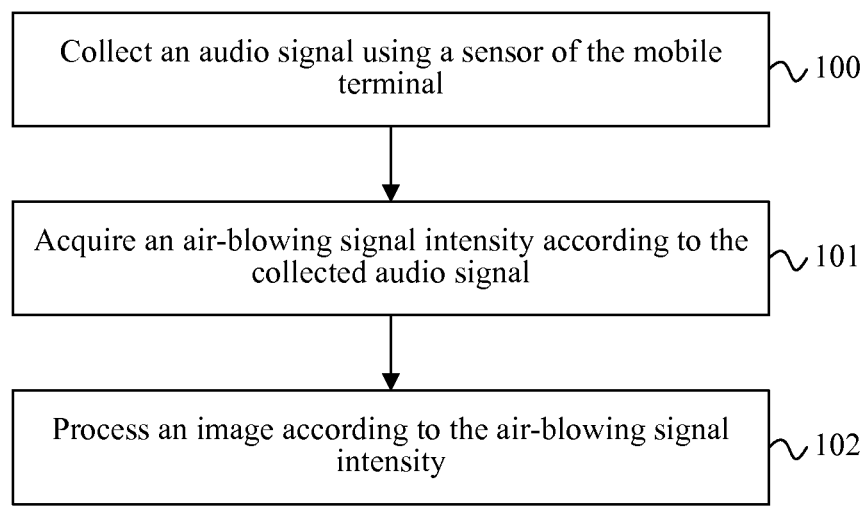
FIG. 1 is a flowchart of an image processing method of a mobile terminal according to exemplary Embodiment 1 of the present invention.

FIG. 1 is a flowchart of an image processing method of a mobile terminal according to exemplary Embodiment 1 of the present invention. As shown in FIG. 1, the image processing method of a mobile terminal according to this embodiment may specifically include the following steps.

Step 100: includes collecting an audio signal using a sensor of the mobile terminal.

Step 101: includes acquiring air-blowing signal intensity according to the collected audio signal.

Step 102: includes processing an image according to the air-blowing signal intensity.

The image processing method of a mobile terminal according to this embodiment is executed by the mobile terminal, and a sensor is disposed in the mobile terminal and configured to collect and receive an audio air-blowing signal by a user. A display is also disposed in the mobile terminal and configured to display the image to be processed and display an image obtained by processing the image according to the air-blowing signal intensity. Step 100 to Step 102 in this implementation manner may specifically be implemented by a program instructing related hardware, where the program may be stored in a computer readable storage medium, and when the program runs, the steps in this method embodiment are performed. The storage medium includes any medium that can store program code, such as an ROM, an RAM, a magnetic disk, or an optical disc.

In the image processing method of a mobile terminal according to this embodiment, an air-blowing signal intensity is acquired, and an image is processed according to the air-blowing signal intensity. By using the technical solution of this embodiment, the image can be processed according to the air-blowing signal intensity, and defects of an image processing manner in the existing technology that the processing efficiency is low and the operation complexity is high can be effectively overcome. In the technical solution of this embodiment, a user is not required to process an image by manually controlling a mouse or a touchpad and can process the image only by blowing air, which provides a new image processing solution, thereby effectively improving the image processing efficiency and reducing the operation complexity.

Optionally, based on the embodiment shown in FIG. 1, Step 101 of acquiring an air-blowing signal intensity according to the collected audio signal may specifically include the following steps, including (1) performing windowed fast Fourier transform (FFT) on the audio signal to obtain a frequency domain signal of the audio signal; and (2) dividing the frequency domain signal of the audio signal into at least one time-slice frequency domain signal.

Specifically, the frequency domain signal of the audio signal may be divided into continuous time-slice frequency domain signals by using a time slice as a cycle. In this embodiment, each time slice represents a time cycle, and a length of the time slice in this embodiment is set as actually required. In this embodiment, the at least one time-slice frequency domain signal obtained by division is continuous in time, that is, during division to obtain the at least one time-slice frequency domain signal, division is sequentially performed in a sequence of time from front to back.

The Step 101 of acquiring an air-blowing signal intensity may further include Steps (3)-(4), for example, (3) identifying whether the audio signal is an air-blowing signal according to the at least one time-slice frequency domain signal and a preset property of an air-blowing signal; and when the audio signal is an air-blowing signal, performing Step (4); and when the audio signal is not the air-blowing signal, end the procedure. In this case, a user may be prompted on an interface of the display that the audio signal is not the air-blowing signal.

The air-blowing signal is a specific low frequency signal; therefore, this step specifically aims to identify whether the audio signal is the specific low frequency signal according to the at least one time-slice frequency domain signal and the preset property of the air-blowing signal.

If a time-slice frequency domain signal meets the preset property of the air-blowing signal, it is determined that the time-slice frequency domain signal is the specific low frequency signal; and if a time-slice frequency domain signal does not meet the preset property of the air-blowing signal, it is determined that the time-slice frequency domain signal is not the specific low frequency signal.

Specifically, Step (3) of identifying whether the audio signal is an air-blowing signal according to the at least one time-slice frequency domain signal and a preset property of an air-blowing signal may specifically include the steps (a)-(d): including (a) identifying, according to each time-slice frequency domain signal among the at least one time-slice frequency domain signal and the preset property of the air-blowing signal, whether the time-slice frequency domain signal is an air-blowing signal.

Specifically, If a time-slice frequency domain signal meets the preset property of the air-blowing signal, it is determined that the time-slice frequency domain signal is an air-blowing signal; and if a time-slice frequency domain signal does not meet the preset property of the air-blowing signal, it is determined that the time-slice frequency domain signal is not an air-blowing signal.

In this step, each time-slice frequency domain signal is identified using the preset property of the air-blowing signal to determine whether each time-slice frequency domain signal is an air-blowing signal.

For example, the preset property of the air-blowing signal includes at least one of the following: First, a maximum intensity of a low frequency signal is greater than an average intensity of a high frequency signal and reaches a second preset threshold; second, a mean square error of a low frequency signal intensity is less than or equal to a third preset threshold, that is, the low frequency signal is evenly distributed; and third, a maximum intensity of a high frequency signal is less than or equal to a fourth preset threshold, that is, the high frequency signal has no obviously strong peak. In this embodiment, the second preset threshold, the third preset threshold, and the fourth preset threshold may all be acquired according to experiences. Besides, the more the preset property of the air-blowing signal includes properties among the foregoing first, second, and third properties, the higher the accuracy of identifying whether a time-slice frequency domain signal is an air-blowing signal is.

Specifically, in an optional implementation manner of this step, an accumulator may be set to count the number of time-slice frequency domain signals that are air-blowing signals, and an initial value of the accumulator is set to 0. For each time-slice frequency domain signal among the at least one time-slice frequency domain signal, if the time-slice frequency domain signal meets the preset property of the air-blowing signal, it is determined that the time-slice frequency domain signal is an air-blowing signal, and 1 is added in the accumulator; or otherwise, no accumulation is performed in the accumulator. After identification of the at least one time-slice frequency domain signal is ended, a value recorded in the accumulator is the number of time-slice frequency domain signals that are among the at least one time-slice frequency domain signal and are air-blowing signals.

Step (b) includes determining a proportion (or ratio) of time-slice frequency domain signals that are air-blowing signals among the at least one time-slice frequency domain signal.

The proportion of the time-slice frequency domain signals that are air-blowing signals among the at least one time-slice frequency domain signal may be obtained by dividing the number, determined in the foregoing step, of time-slice frequency domain signals that are among the at least one time-slice frequency domain signal and are air-blowing signals by the total number of the at least one time-slice frequency domain signal.

Step (c) includes determining whether the proportion of the time-slice frequency domain signals that are air-blowing signals among the at least one time-slice frequency domain signal is greater than or equal to a first preset threshold; and when the proportion of the time-slice frequency domain signals that are air-blowing signals among the at least one time-slice frequency domain signal is greater than or equal to the first preset threshold, perform step (d); or otherwise, perform Step (e).

Step (d) includes determining that the audio signal is the air-blowing signal, and perform step (4).

Step (3) includes determining that the audio signal is not the air-blowing signal.

Specifically, the number of time-slice frequency domain signals that are among the at least one time-slice frequency domain signal and are air-blowing signals can be obtained according to an identification result of identifying whether each time-slice frequency domain signal is an air-blowing signal in Step (a). For example, after the identifying whether the at least one time-slice frequency domain signal is an air-blowing signal is ended, a value recorded in the accumulator represents the number of time-slice frequency domain signals that are among the at least one time-slice frequency domain signal and are air-blowing signals. The proportion of the time-slice frequency domain signals that are air-blowing signals among the at least one time-slice frequency domain signal can then be determined according to Step (b). When the proportion is greater than or equal to the first preset threshold, the audio signal is the air-blowing signal; or otherwise, the audio signal is not the air-blowing signal. The first preset threshold may be set to any percentage between 0 to a hundred percent as actually required, and may be, for example, 70% or 80%.

Step (4) includes acquiring the air-blowing signal intensity according to the at least one time-slice frequency domain signal.

When it is determined that the audio signal is the air-blowing signal, the acquiring the air-blowing signal intensity according to the at least one time-slice frequency domain signal may specifically be: first acquiring an average signal intensity of each time-slice frequency domain signal among the at least one time-slice frequency domain signal to obtain at least one average signal intensity, and then using an average value of the at least one average signal intensity as the air-blowing signal intensity.

By using the specific manner of this embodiment, when the audio signal is an air-blowing signal, the air-blowing signal intensity can be acquired.

Further, optionally, before the performing windowed fast Fourier transform (FFT) on the audio signal to obtain a frequency domain signal of the audio signal in Step (1) of this embodiment, the method may further include the following step: performing smoothing processing and equalization processing on the audio signal. This step is mainly used to perform preliminary smoothing and self-defined equalization on the collected audio signal, so that a signal characteristic of the audio signal in a frequency domain can become more obvious.

Further, optionally, based on the technical solution of the embodiment shown in FIG. 1, Step 102 of processing an image according to the air-blowing signal intensity may specifically include: (i) acquiring an image processing parameter according to the air-blowing signal intensity.

The acquiring an image processing parameter according to the air-blowing signal intensity may specifically be: acquiring, according to the air-blowing signal intensity and a preset correspondence relationship between an air-blowing signal intensity and an image processing parameter, the image processing parameter corresponding to the air-blowing signal intensity. Specifically, the correspondence relationship between an air-blowing signal intensity and an image processing parameter may be preset in the mobile terminal. For example, when the air-blowing signal intensity is A, the image processing parameter is 0.8; when the air-blowing signal intensity is B, the image processing parameter is 1.2; and when the air-blowing signal intensity is C, the image processing parameter is 1.5. The image processing parameter herein may specifically represent a ratio of a size of an image obtained after processing to a size of a current image. That is, the image processing parameter being 0.8 represents zooming out the current image by 0.8 time, and the image processing parameter being 1.5 represents zooming in the current image by 1.5 times. In an actual application, a table of the correspondence relationship between an air-blowing signal intensity and an image processing parameter may be preset in the mobile terminal.

It should be noted that the image processing parameter in this embodiment is only used as an example and constitutes no limitation on the image processing parameter protected by the claims of this application, and an actual image processing parameter may be any other value as actually required.

The preset correspondence relationship between an air-blowing signal intensity and an image processing parameter may be a one-to-one correspondence, and may also be a multiple-to-one correspondence, that is, intensity values, within an area range, of air-blowing signals correspond to a same image processing parameter.

Alternatively, a function relationship (where a specific type of a function is not limited) between the air-blowing signal intensity and the image processing parameter may also be preset according to experience; and when the air-blowing signal intensity is determined, the image processing parameter can be determined according to the preset function relationship.

Referring back to Step 102, the method further includes Step (ii) to process the image according to the image processing parameter.

The processing an image involved in this embodiment of the present invention mainly includes zooming in the image or zooming out the image.

For example, according to the foregoing record, the image may be specifically zoomed in or zoomed out according to the image processing parameter. It should be noted that before step (ii), the method may further include selecting a specified to-be-processed area in the image, and the specified to-be-processed area in the image may be specifically zoomed in or zoomed out according to the image processing parameter. For example, a user may select the specified to-be-processed area in the image using a touchscreen or a mouse. If the image is a face, a specified area in the image such as the eyes, the nose, the mouth, or the forehead on the face may be selected and zoomed in or zoomed out. When no specified to-be-processed area in the image is selected, it may be understood that the whole image needs to be processed.

It should be noted that to make image processing more enjoyable, an air-blowing tube may be disposed at an edge of a displayed image, so that a user senses that air blown by the user through a microphone enters the image through the air-blowing tube so as to zoom in or zoom out the image. Besides, when the image processing parameter is greater than 1 or less than 1, an insertion depth at which the air-blowing tube is disposed varies, so as to effectively distinguish forms of representing the air-blowing tube when the image is zoomed out and zoomed in. For example, a depth threshold in the case in which the image processing parameter is 1 may be used; and an insertion depth of the air-blowing tube displayed when the image processing parameter is greater than 1 is greater than the depth threshold, while an insertion depth of the air-blowing tube displayed when the image processing parameter is less than 1 is less than the depth threshold.

It should be noted that during processing of the image or a specified to-be-processed area in the image, the image or the specified to-be-processed area in the image may be specifically processed by using a self-defined image processing algorithm. In this embodiment, the image processing algorithm may be specifically an algorithm similar to liquefying or feathering, and enables the image or a specified area in the image to vary in a mild and natural manner during zooming in or zooming out.

All the foregoing optional technical solutions may be combined in any way to form an optional embodiment of the present invention, which is not described herein one by one.

In the image processing method of a mobile terminal according to the foregoing embodiment, an image can be processed according to an air-blowing signal intensity, and defects of an image processing manner in the existing technology that the processing efficiency is low and the operation complexity is high can be effectively overcome. In the technical solution of the foregoing embodiment, a user is not required to process an image by manually controlling a mouse or a touchpad and can process the image only by blowing air, which provides a new image processing solution, thereby effectively improving the image processing efficiency and reducing the operation complexity.

Figure 2:
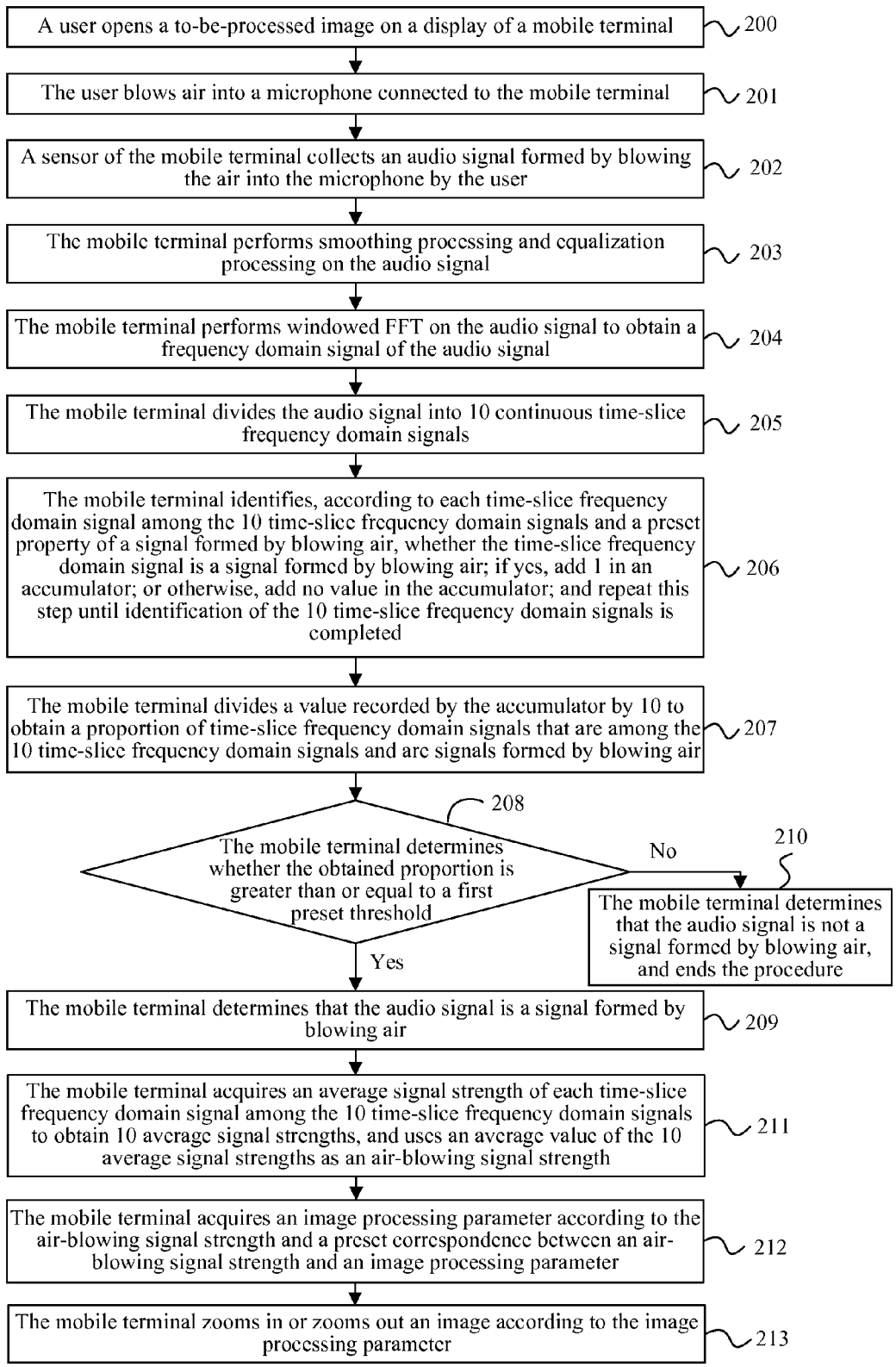
FIG. 2 is a flowchart of an image processing method of a mobile terminal according to exemplary Embodiment 2 of the present invention.

FIG. 2 is a flowchart of an image processing method of a mobile terminal according to exemplary Embodiment 2 of the present invention. As shown in FIG. 2, the image processing method of this embodiment may specifically include the following steps.

Step 200: a user opens a to-be-processed image on a display of a mobile terminal.

For example, specifically, a specified area of the image may further be selected for processing; and in this embodiment, the technical solution of the present disclosure is introduced in detail by using processing of a whole image as an example.

Step 201: the user blows air into a microphone connected to the mobile terminal.

Specifically, the user may control, according to experience, an intensity of the air blown into the microphone.

Step 202: a sensor of the mobile terminal collects an audio signal formed by blowing the air into the microphone by the user. In this embodiment, the sensor of the mobile terminal is connected to the microphone.

Step 203: the mobile terminal performs smoothing processing and equalization processing on the audio signal. By using this step, a signal characteristic of the audio signal in a frequency domain can become more obvious.

Step 204: the mobile terminal performs windowed FFT on the audio signal to obtain a frequency domain signal of the audio signal.

Step 205: the mobile terminal divides the audio signal into 10 continuous time-slice frequency domain signals.

In an actual application, the number of time-slice frequency domain signals obtained by division according to an intensity of an air-blowing signal and a length of a time slice may vary, where the length of the time slice may be set as actually required. In this embodiment, the technical solution of the present disclosure is introduced by using an example in which the audio signal is divided into 10 time-slice frequency domain signals, and this number does not constitute any limitation on the technical solution of the embodiment of the present invention.

Step 206: the mobile terminal identifies, according to each time-slice frequency domain signal among the 10 time-slice frequency domain signals and a preset property of an air-blowing signal, whether the time-slice frequency domain signal is an air-blowing signal; if yes, add 1 in an accumulator; or otherwise, add no value in the accumulator; and repeat this step until identification of the 10 time-slice frequency domain signals is ended.

An initial value of the accumulator is 0; and after identification of the 10 time-slice frequency domain signals is completed, a value of the accumulator is the number of time-slice frequency domain signals that are among the 10 time-slice frequency domain signals and are air-blowing signals.

Step 207: the mobile terminal divides a value recorded by the accumulator by 10 to obtain a proportion of time-slice frequency domain signals that are among the 10 time-slice frequency domain signals and are air-blowing signals.

Step 208: the mobile terminal determines whether the obtained proportion is greater than or equal to a first preset threshold; and if the proportion is greater than or equal to the first preset threshold, performs Step 209; or otherwise, performs Step 210.

Specifically, it is determined whether the proportion of the time-slice frequency domain signals that are among the 10 time-slice frequency domain signals and are air-blowing signals is greater than or equal to the first preset threshold. For example, the first preset threshold may be set to 0.7, that is, seventy percent according to an actual case; and in this case, when there are seven or more time-slice frequency domain signals that are among the 10 time-slice frequency domain signals and are air-blowing signals, it can be regarded that the audio signal is an air-blowing signal; or otherwise, it is regarded that the audio signal is not an air-blowing signal.

Step 209: the mobile terminal determines that the audio signal is an air-blowing signal, and performs step 211.

Step 210: the mobile terminal determines that the audio signal is not an air-blowing signal, and ends the procedure.

Specifically, during implementation, the mobile terminal may prompt, on an interface of the display, a user that the collected audio signal is not the air-blowing signal and the image cannot be processed according to the audio signal.

Step 211: the mobile terminal acquires an average signal intensity of each time-slice frequency domain signal among the 10 time-slice frequency domain signals to obtain 10 average signal intensities, and uses an average value of the 10 average signal intensities as an air-blowing signal intensity.

Step 212: the mobile terminal acquires an image processing parameter according to the air-blowing signal intensity and a preset correspondence relationship between an air-blowing signal intensity and an image processing parameter.

Specifically, the mobile terminal acquires, according to the air-blowing signal intensity and the preset correspondence relationship between an air-blowing signal intensity and an image processing parameter, the image processing parameter corresponding to the air-blowing signal intensity.

Step 213: the mobile terminal zooms in or zooms out an image according to the image processing parameter. Specifically, when the image processing parameter is greater than 1, the image is zoomed in; and when the image processing parameter is less than 1, the image is zoomed out.

In the image processing method of a mobile terminal according to this embodiment, an image can be processed according to an air-blowing signal intensity, and defects of an image processing manner in the existing technology that the processing efficiency is low and the operation complexity is high can be effectively overcome. In the technical solution of this embodiment, a user is not required to process an image by manually controlling a mouse or a touchpad and can process the image only by blowing air, which provides a new image processing solution, thereby effectively improving the image processing efficiency and reducing the operation complexity.

Figure 3:
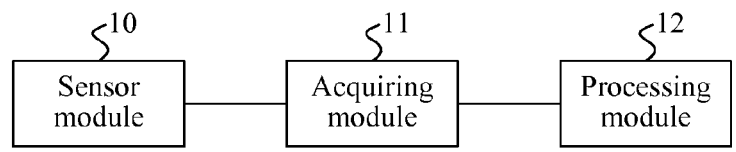
FIG. 3 is a schematic structural diagram of a mobile terminal according to exemplary Embodiment 3 of the present invention.

FIG. 3 is a schematic structural diagram of a mobile terminal according to exemplary Embodiment 3 of the present invention. As shown in FIG. 3, the mobile terminal of this embodiment may specifically include a sensor module 10, an acquiring module 11, and a processing module 12.

The sensor module 10 is configured to collect an audio signal. The acquiring module 11 is configured to acquire an air-blowing signal intensity according to the audio signal collected by the sensor module 10. The processing module 12 is connected to the acquiring module 11 and the processing module 12 is configured to process an image according to the air-blowing signal intensity acquired by the acquiring module 11.

In this embodiment, a mechanism of processing an image of the mobile terminal by the mobile terminal by using the foregoing modules is the same as that in the foregoing corresponding method embodiment; and reference may be made to the record in the foregoing related method embodiment for details, which are not described herein again.

The mobile terminal of this embodiment can collect an audio signal, and process an image according to the collected audio signal and an air-blowing signal intensity by using the foregoing modules, and defects of an image processing manner in the existing technology that the processing efficiency is low and the operation complexity is high can be effectively overcome. In the technical solution of the foregoing embodiment, a user is not required to process an image by manually controlling a mouse or a touchpad and can process the image only by blowing air, which provides a new image processing solution, thereby effectively improving the image processing efficiency and reducing the operation complexity.

Figure 4:
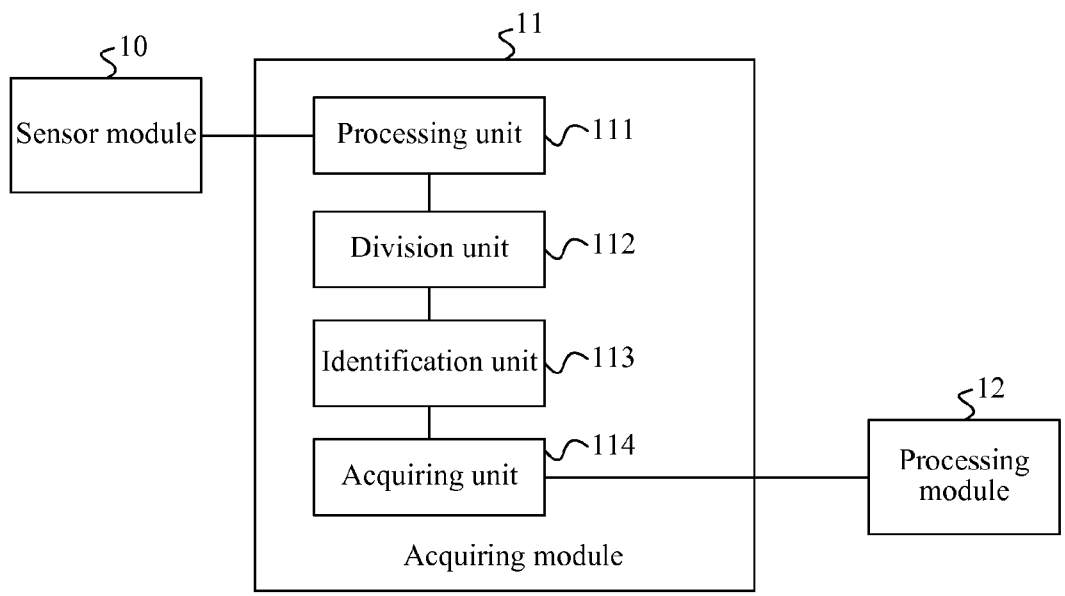
FIG. 4 is a schematic structural diagram of a mobile terminal according to exemplary Embodiment 4 of the present invention.

FIG. 4 is a schematic structural diagram of a mobile terminal according to exemplary Embodiment 4 of the present invention. As shown in FIG. 4, based on the embodiment shown in FIG. 3, the mobile terminal of this embodiment may further include the following technical solution.

As shown in FIG. 4, the acquiring module 11 in the mobile terminal of this embodiment may specifically include a processing unit 111, a division unit 112, an identification unit 113, and an acquiring unit 114.

The processing unit 111 is connected to the sensor module 10, and the processing unit 111 is configured to perform windowed FFT on the audio signal collected by the sensor module 10 to obtain a frequency domain signal of the audio signal. The division unit 112 is connected to the processing unit 111, and the division unit 112 is configured to divide the frequency domain signal of the audio signal obtained by the processing unit 111 into at least one time-slice frequency domain signal. The identification unit 113 is connected to the division unit 112, and the identification unit 113 is configured to identify whether the audio signal is an air-blowing signal according to the at least one time-slice frequency domain signal obtained by division by the division unit 112 and a preset property of an air-blowing signal. The acquiring unit 114 is connected to the identification unit 113, and the acquiring unit 114 is configured to: when the identification unit 113 identifies that the audio signal is the air-blowing signal, acquire the air-blowing signal intensity according to the at least one time-slice frequency domain signal.

Further, optionally, the identification unit 113 in the mobile terminal of this embodiment is specifically configured to identify, according to each time-slice frequency domain signal among the at least one time-slice frequency domain signal and the preset property of the air-blowing signal, whether the time-slice frequency domain signal is an air-blowing signal; determine a proportion of time-slice frequency domain signals that are air-blowing signals among the at least one time-slice frequency domain signal; determine whether the proportion of the time-slice frequency domain signals that are air-blowing signals among the at least one time-slice frequency domain signal is greater than or equal to a first preset threshold; and determine, when the proportion of the time-slice frequency domain signals that are air-blowing signals among the at least one time-slice frequency domain signal is greater than or equal to the first preset threshold, that the audio signal is the air-blowing signal; or otherwise, determine that the audio signal is not the air-blowing signal.

Further, optionally, the processing unit 111 in the mobile terminal of this embodiment is further configured to perform smoothing processing and equalization processing on the audio signal after the sensor module 10 collects the audio signal and before the processing unit 111 performs windowed FFT on the audio signal to obtain the frequency domain signal of the audio signal, so that a signal characteristic of the audio signal in a frequency domain can become more obvious.

Further, optionally, the acquiring unit 114 in the mobile terminal of this embodiment is specifically configured to acquire an average signal intensity of each time-slice frequency domain signal among the at least one time-slice frequency domain signal to obtain at least one average signal intensity, and use an average value of the at least one average signal intensity as the air-blowing signal intensity.

It should be noted that in this embodiment, the preset property of the air-blowing signal includes at least one of that a maximum intensity of a low frequency signal is greater than an average intensity of a high frequency signal and reaches a second preset threshold, a mean square error of a low frequency signal intensity is less than or equal to a third preset threshold, and a maximum intensity of a high frequency signal is less than or equal to a fourth preset threshold.

Further, optionally, the processing module 12 in the mobile terminal of this embodiment is specifically configured to acquire an image processing parameter according to the air-blowing signal intensity acquired by the acquiring module 11, and process the image according to the image processing parameter. As shown in FIG. 4, the processing module 12 may be specifically connected to the acquiring unit 114; and acquires the image processing parameter according to the air-blowing signal intensity acquired by the acquiring unit 114, and processes the image according to the image processing parameter.

Further, optionally, the processing module 12 is specifically configured to acquire, according to the air-blowing signal intensity and a preset correspondence relationship between an air-blowing signal intensity and an image processing parameter, the image processing parameter corresponding to the air-blowing signal intensity; and process the image according to the image processing parameter.

Note that all the foregoing optional technical solutions in various embodiments may be combined in any manner to form additional embodiments of the present invention without limitation.

In this embodiment, a mechanism of processing an image by the mobile terminal by using the foregoing modules is the same as that in the foregoing corresponding method embodiment; and reference may be made to the record in the foregoing related method embodiment for details, which are not described herein again.

The mobile terminal of this embodiment can effectively overcome, by using the foregoing modules, defects of a mobile terminal in an image processing manner in the existing technology. In the technical solution of this embodiment, a user is not required to process an image by manually controlling a mouse or a touchpad and can process the image only by blowing air, which provides a new image processing solution, thereby effectively improving the image processing efficiency and reducing the operation complexity.

Figure 5:
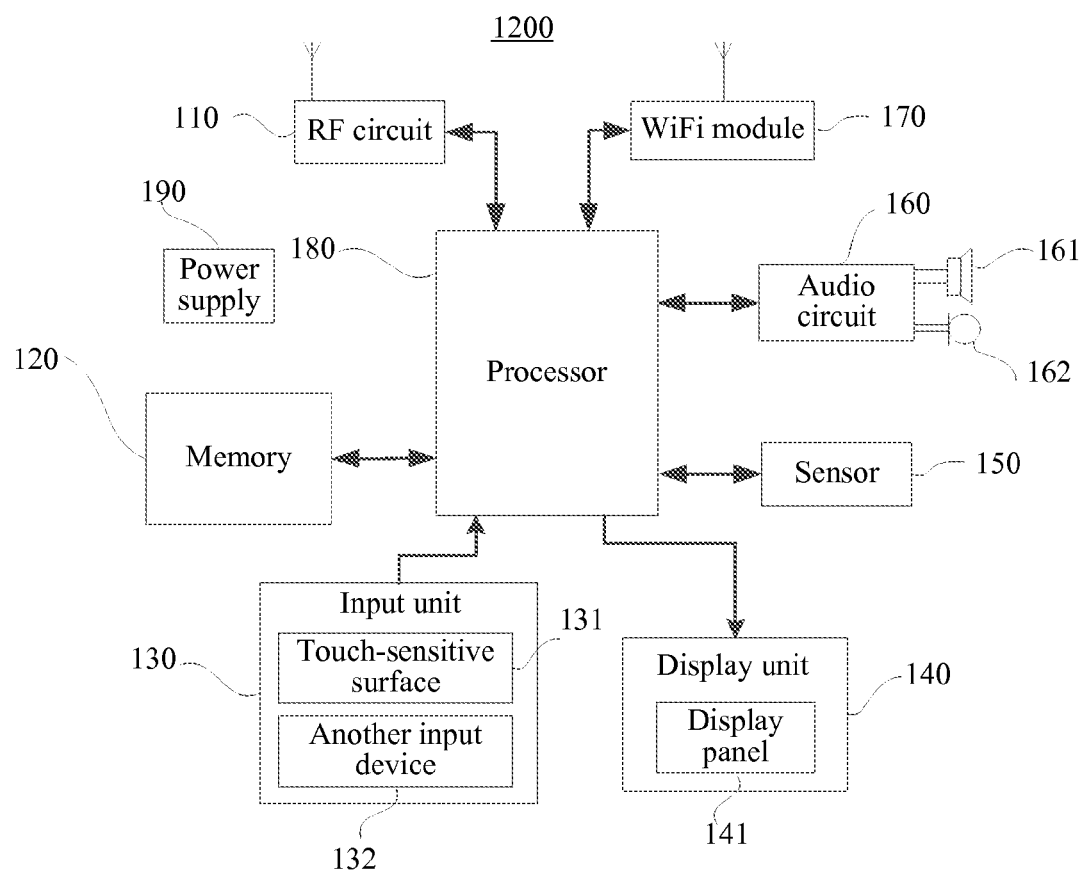
FIG. 5 is a schematic structural diagram of a mobile terminal according to exemplary Embodiment 5 of the present invention.

FIG. 5 is a schematic structural diagram of a mobile terminal according to exemplary Embodiment 5 of the present invention. As shown in FIG. 5, the mobile terminal of this embodiment may be configured to implement the image processing methods of a mobile terminal provided in the foregoing embodiments. Details are as follows:

The mobile terminal 1200 may include components such as a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, and a power supply 190. A person skilled in the art may understand that the structure of the mobile terminal shown in FIG. 5 constitutes no limitation on the mobile terminal, and the mobile terminal may include more components or fewer components than those shown in the figure, or some components may be combined, or a different component deployment may be used.

The RF circuit 110 may be configured to receive and send signals during an information receiving and sending process or a call process; and specifically receive downlink information from a base station, then deliver the downlink information to one or more processors 180 for processing, and send related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile Communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (for example, a sound playback function and an image display function), and the like. The data storage area may store data (such as audio data and an address book) created according to use of the mobile terminal 1200, and the like. In addition, the memory 120 may include a high speed random access memory, and may also include a non-volatile memory, such as at least one magnetic disk storage device, a flash memory, or another volatile solid-state storage device. Accordingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and another input device 132. The touch-sensitive surface 131 may also be referred to as a touch display screen or a touch panel, and may collect a touch operation of a user on or near the touch-sensitive surface (such as an operation of a user on or near the touch-sensitive surface 131 by using any suitable object or attachment, such as a finger or a touch pen), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface acoustic wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, a joystick, and the like.

The display unit 140 may be configured to display information input by the user or information provided for the user, and various graphical user interfaces of the mobile terminal 1200. The graphical user interfaces may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 5, the touch-sensitive surface 131 and the display panel 141 are used as two separate parts to implement input and output functions, in some embodiments, the touch-sensitive surface 131 and the display panel 141 may be integrated to implement the input and output functions.

The mobile terminal 1200 may further include at least one sensor 150, for example, a light sensor, a motion sensor, or other sensors. Specifically, the light sensor may include an ambient light sensor and a proximity sensor. The ambient light sensor may adjust luminance of the display panel 141 according to brightness of the ambient light. The proximity sensor may switch off the display panel 141 and/or backlight when the mobile terminal 1200 is moved to the ear. As one type of motion sensor, a gravity acceleration sensor may detect magnitude of accelerations in various directions (which generally are triaxial), may detect magnitude and a direction of the gravity when static, and may be used for an application that recognizes the attitude of the mobile phone (for example, switching between landscape orientation and portrait orientation, a related game, and magnetometer attitude calibration), and a function related to vibration recognition (such as a pedometer and a knock). Other sensors, such as a gyroscope, a barometer, a hygrometer, a thermometer, and an infrared sensor, which may be configured in the mobile terminal 1200 are not further described herein.

The audio circuit 160, a loudspeaker 161, and a microphone 162 may provide an audio interface between a user and the mobile terminal 1200. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another mobile terminal by using the RF circuit 110, or outputs the audio data to the memory 120 for further processing. The audio circuit 160 may further include an earphone jack, so as to provide communication between a peripheral earphone and the mobile terminal 1200.

WiFi is a short-distance wireless transmission technology. The mobile terminal 1200 may help, by using the WiFi module 170, a user to receive and send an e-mail, browse a webpage, and access stream media, and the like, which provides wireless broadband Internet access for the user. Although FIG. 5 shows the WiFi module 170, it can be understood that the WiFi module 170 is not a necessary component of the mobile terminal 1200, and when required, the WiFi module 170 may be omitted as long as the scope of the essence of the present disclosure is not changed.

The processor 180 is a control center of the mobile terminal 1200, and connects to various parts of the entire mobile phone by using various interfaces and lines. By running or executing the software program and/or module stored in the memory 120, and invoking data stored in the memory 120, the processor 180 performs various functions and data processing of the mobile terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may also not be integrated into the processor 180.

The mobile terminal 1200 further includes the power supply 190 (such as a battery) for supplying power to the components. Preferably, the power supply may logically connect to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

Although not shown in the figure, the mobile terminal 1200 may further include a camera, a Bluetooth module, and the like, which are not further described herein. Specifically, in this embodiment, the display unit of the mobile terminal is a touchscreen display, and the mobile terminal further includes a memory and one or more programs. The one or more programs are stored in the memory and configured to be executed by one or more processors. The one or more programs include instructions for performing the following operations: collecting an audio signal using a sensor of the mobile terminal; acquiring an air-blowing signal intensity according to the collected audio signal; and processing an image according to the air-blowing signal intensity.

Assuming that the foregoing is a first possible implementation manner, then in a second possible implementation manner provided based on the first possible implementation manner, the memory of the mobile terminal further includes instructions for performing the following operations: performing windowed FFT on the audio signal to obtain a frequency domain signal of the audio signal; dividing the frequency domain signal of the audio signal into at least one time-slice frequency domain signal; identifying whether the audio signal is an air-blowing signal according to the at least one time-slice frequency domain signal and a preset property of an air-blowing signal; and acquiring the air-blowing signal intensity according to the at least one time-slice frequency domain signal when the audio signal is an air-blowing signal.

In a third possible implementation manner provided based on the second possible implementation manner, the memory of the mobile terminal further includes instructions for performing the following operations: identifying, according to each time-slice frequency domain signal among the at least one time-slice frequency domain signal and the preset property of the air-blowing signal, whether the time-slice frequency domain signal is an air-blowing signal; determining a proportion of time-slice frequency domain signals that are air-blowing signals among the at least one time-slice frequency domain signal; determining whether the proportion of the time-slice frequency domain signals that are air-blowing signals among the at least one time-slice frequency domain signal is greater than or equal to a first preset threshold; and determining, when the proportion of the time-slice frequency domain signals that are air-blowing signals among the at least one time-slice frequency domain signal is greater than or equal to the first preset threshold, that the audio signal is the air-blowing signal; or otherwise, determining that the audio signal is not the air-blowing signal.

In a fourth possible implementation manner provided based on the second or third possible implementation manner, the memory of the mobile terminal further includes an instruction for performing the following operation: performing smoothing processing and equalization processing on the audio signal.

In a fifth possible implementation manner provided based on the fourth possible implementation manner, the memory of the mobile terminal further includes instructions for performing the following operations: acquiring an average signal intensity of each time-slice frequency domain signal among the at least one time-slice frequency domain signal to obtain at least one average signal intensity; and using an average value of the at least one average signal intensity as the air-blowing signal intensity.

In a sixth possible implementation manner provided based on the second or third possible implementation manner, the memory of the mobile terminal further includes an instruction for performing the following operation: the preset property of the air-blowing signal includes at least one of that a maximum intensity of a low frequency signal is greater than an average intensity of a high frequency signal and reaches a second preset threshold, a mean square error of a low frequency signal intensity is less than or equal to a third preset threshold, and a maximum intensity of a high frequency signal is less than or equal to a fourth preset threshold.

In a seventh possible implementation manner provided based on the first possible implementation manner, the memory of the mobile terminal further includes instructions for performing the following operations: acquiring an image processing parameter according to the air-blowing signal intensity; and processing the image according to the image processing parameter.

In an eighth possible implementation manner provided based on the seventh possible implementation manner, the memory of the mobile terminal further includes an instruction for performing the following operation: acquiring, according to the air-blowing signal intensity and a preset correspondence relationship between an air-blowing signal intensity and an image processing parameter, the image processing parameter corresponding to the air-blowing signal intensity.

The mobile terminal of this embodiment can effectively overcome, by using the foregoing modules, defects of a mobile terminal in an image processing manner in the existing technology. In the technical solution of this embodiment, a user is not required to process an image by manually controlling a mouse or a touchpad and can process the image only by blowing air, which provides a new image processing solution, thereby effectively improving the image processing efficiency and reducing the operation complexity.

As another aspect, another embodiment of the present invention further includes a non-transitory computer readable storage medium. The non-transitory computer readable storage medium may be the computer readable storage medium included in the memory in the foregoing embodiment, and may also be a computer readable storage medium that exists independently and is not mounted into a mobile terminal. The computer readable storage medium stores one or more programs, and the one or more programs are used by one or more processors to execute an image processing method of a mobile terminal. The method includes: collecting an audio signal using a sensor of the mobile terminal; acquiring an air-blowing signal intensity according to the collected audio signal; and processing an image according to the air-blowing signal intensity.

Assuming that the foregoing is a first possible implementation manner, then in a second possible implementation manner provided based on the first possible implementation manner, the acquiring an air-blowing signal intensity according to the collected audio signal includes: performing windowed FFT on the audio signal to obtain a frequency domain signal of the audio signal; dividing the frequency domain signal of the audio signal into at least one time-slice frequency domain signal; identifying whether the audio signal is an air-blowing signal according to the at least one time-slice frequency domain signal and a preset property of an air-blowing signal; and acquiring the air-blowing signal intensity according to the at least one time-slice frequency domain signal when the audio signal is an air-blowing signal.

In a third possible implementation manner provided based on the second possible implementation manner, the identifying whether the audio signal is an air-blowing signal according to the at least one time-slice frequency domain signal and a preset property of an air-blowing signal includes: identifying, according to each time-slice frequency domain signal among the at least one time-slice frequency domain signal and the preset property of the air-blowing signal, whether the time-slice frequency domain signal is an air-blowing signal; determining a proportion of time-slice frequency domain signals that are air-blowing signals among the at least one time-slice frequency domain signal; determining whether the proportion of the time-slice frequency domain signals that are air-blowing signals among the at least one time-slice frequency domain signal is greater than or equal to a first preset threshold; and determining, when the proportion of the time-slice frequency domain signals that are air-blowing signals among the at least one time-slice frequency domain signal is greater than or equal to the first preset threshold, that the audio signal is the air-blowing signal; or otherwise, determining that the audio signal is not the air-blowing signal.

In a fourth possible implementation manner provided based on the second or third possible implementation manner, after the collecting an audio signal, and before the performing windowed FFT on the audio signal to obtain a frequency domain signal of the audio signal, the method further includes: performing smoothing processing and equalization processing on the audio signal.

In a fifth possible implementation manner provided based on the fourth possible implementation manner, the acquiring the air-blowing signal intensity according to the at least one time-slice frequency domain signal includes: acquiring an average signal intensity of each time-slice frequency domain signal among the at least one time-slice frequency domain signal to obtain at least one average signal intensity; and using an average value of the at least one average signal intensity as the air-blowing signal intensity.

In a sixth possible implementation manner provided based on the second or third possible implementation manner, the preset property of the air-blowing signal includes at least one of that a maximum intensity of a low frequency signal is greater than an average intensity of a high frequency signal and reaches a second preset threshold, a mean square error of a low frequency signal intensity is less than or equal to a third preset threshold, and a maximum intensity of a high frequency signal is less than or equal to a fourth preset threshold.

In a seventh possible implementation manner provided based on the first possible implementation manner, the processing an image according to the air-blowing signal intensity includes: acquiring an image processing parameter according to the air-blowing signal intensity; and processing the image according to the image processing parameter.

In an eighth possible implementation manner provided based on the seventh possible implementation manner, the acquiring an image processing parameter according to the air-blowing signal intensity includes: acquiring, according to the air-blowing signal intensity and a preset correspondence relationship between an air-blowing signal intensity and an image processing parameter, the image processing parameter corresponding to the air-blowing signal intensity.

As still another aspect, another embodiment of the present invention further provides a graphical user interface, where the graphical user interface is used in a mobile terminal, the mobile terminal includes a touchscreen display, a memory, and one or more processors configured to execute one or more programs, and the graphical user interface includes: collecting an audio signal using a sensor of the mobile terminal; acquiring an air-blowing signal intensity according to the collected audio signal; and processing an image according to the air-blowing signal intensity.

It should be noted that categorization of the foregoing functional modules is merely used as an example to describe image processing by the mobile terminal provided in the foregoing embodiments. In an actual application, as required, the foregoing functions may be allocated to different functional modules for implementation. That is, the internal structure of the mobile terminal is divided into different functional modules, so as to perform all or a part of the functions described above. In addition, the embodiments of the mobile terminal and the image processing method of a mobile terminal that are provided in the foregoing embodiments belong to a same idea, where for a specific implementation process thereof, refer to the method embodiments, and no detailed description is provided herein again.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing embodiments are merely preferred embodiments of the present invention, and are not intended to limit the present disclosure. Any modification, equivalent replacement, improvement, and the like made without departing from the spirit and principle of the present disclosure shall fall within the protection scope of the present disclosure.

What is claimed is:

1. An image processing method of a mobile terminal, comprising:
    collecting an audio signal using a sensor of the mobile terminal;
    performing a windowed fast Fourier transform (FFT) on the audio signal to obtain a frequency domain signal of the audio signal;
    dividing the frequency domain signal of the audio signal into at least one time-slice frequency domain signal;
    identifying whether the audio signal is an air-blowing signal according to the at least one time-slice frequency domain signal and a preset property of the air-blowing signal; and
    acquiring an air-blowing signal intensity according to the at least one time-slice frequency domain signal when the audio signal is identified as an air-blowing signal;
    determining whether a specified to-be-processed area in an image is selected;
    processing, according to the air-blowing signal intensity, the specified to-be-processed area when the specified to-be-processed area in the image is selected, and the entire image when no specified to-be-processed area in the image is selected, wherein processing according to the air-blowing signal intensity comprises:
    acquiring an image processing parameter according to the air-blowing signal intensity and according to a preset correspondence relationship between the air-blowing signal intensity and an image processing parameter, and
    processing, according to the image processing parameter, the specified to-be-processed area when the specified to-be-processed area in the image is selected, and the entire image when no specified to-be-processed area in the image is selected; and
    disposing an air-blowing tool on the image, wherein a disposed location of the air-blowing tool indicates a value of the image processing parameter.

2. The method according to claim 1, wherein the step of identifying whether the audio signal is the air-blowing signal according to the at least one time-slice frequency domain signal and the preset property of the air-blowing signal comprises:
    identifying, according to each time-slice frequency domain signal among the at least one time-slice frequency domain signal and the preset property of the air-blowing signal, whether the time-slice frequency domain signal is an air-blowing signal;
    determining a proportion of time-slice frequency domain signals that are air-blowing signals among the at least one time-slice frequency domain signal;
    determining whether the proportion of the time-slice frequency domain signals that are air-blowing signals among the at least one time-slice frequency domain signal is greater than or equal to a first preset threshold; and
    determining, when the proportion of the time-slice frequency domain signals that are air-blowing signals among the at least one time-slice frequency domain signal is greater than or equal to the first preset threshold, that the audio signal is the air-blowing signal; or otherwise, determining that the audio signal is not the air-blowing signal.

3. The method according to claim 1, wherein after the step of collecting the audio signal and before the step of performing windowed fast Fourier transform (FFT) on the audio signal to obtain the frequency domain signal of the audio signal, the method further comprises:
performing a smoothing processing and an equalization processing on the audio signal.

4. The method according to claim 3, wherein the step of acquiring the air-blowing signal intensity according to the at least one time-slice frequency domain signal comprises:
acquiring an average signal intensity of each time-slice frequency domain signal among the at least one time-slice frequency domain signal to obtain at least one average signal intensity; and
using an average value of the at least one average signal intensity as the air-blowing signal intensity.

5. The method according to claim 1, wherein the preset property of the air-blowing signal comprises at least one of that:
a maximum intensity of low frequency signals is greater than an average intensity of high frequency signals and reaches a second preset threshold;
a mean square error of low frequency signal intensities is less than or equal to a third preset threshold; and
a maximum intensity of the high frequency signals is less than or equal to a fourth preset threshold.

6. A mobile terminal, comprising:
a sensor module, configured to collect an audio signal;
an acquiring module, configured to acquire an air-blowing signal intensity according to the collected audio signal, wherein the acquiring module comprises:
a processing unit, configured to perform a windowed fast Fourier transform (FFT) on the audio signal to obtain a frequency domain signal of the audio signal;
a division unit, configured to divide the frequency domain signal of the audio signal into at least one time-slice frequency domain signal;
an identification unit, configured to identify whether the audio signal is an air-blowing signal according to the at least one time-slice frequency domain signal and a preset property of the air-blowing signal; and
an acquiring unit, configured to acquire the air-blowing signal intensity according to the at least one time-slice frequency domain signal when the audio signal is identified as an air-blowing signal; and
a processing module, configured to process, according to the air-blowing signal intensity, a specified to-be-processed area when the specified to-be-processed area in the image is selected, and the entire image when no specified to-be-processed area in the image is selected, wherein the processing module is configured to acquire an image processing parameter according to the air-blowing signal intensity and according to a preset correspondence relationship between the air-blowing signal intensity and an image processing parameter, and to process, according to the image processing parameter, the specified to-be-processed area when the specified to-be-processed area in the image is selected, and the entire image when no specified to-be-processed area in the image is selected, and further configured to dispose an air-blowing tool on the image, wherein a disposed location of the air-blowing tool indicates a value of the image processing parameter.

7. The mobile terminal according to claim 6, wherein the identification unit is configured:
to identify, according to each time-slice frequency domain signal among the at least one time-slice frequency domain signal and the preset property of the air-blowing signal, whether the time-slice frequency domain signal is an air-blowing signal;
to determine a proportion of time-slice frequency domain signals that are air-blowing signals among the at least one time-slice frequency domain signal;
to determine whether the proportion of the time-slice frequency domain signals that are air-blowing signals among the at least one time-slice frequency domain signal is greater than or equal to a first preset threshold; and
to determine, when the proportion of the time-slice frequency domain signals that are air-blowing signals among the at least one time-slice frequency domain signal is greater than or equal to the first preset threshold, that the audio signal is the air-blowing signal; or otherwise, determine that the audio signal is not the air-blowing signal.

8. The mobile terminal according to claim 6, wherein the processing unit is further configured to perform a smoothing processing and an equalization processing on the audio signal after the sensor module collects the audio signal and before the processing unit performs windowed FFT on the audio signal to obtain the frequency domain signal of the audio signal.

9. The mobile terminal according to claim 8, wherein the acquiring unit is configured to acquire an average signal intensity of each time-slice frequency domain signal among the at least one time-slice frequency domain signal to obtain at least one average signal intensity, and to use an average value of the at least one average signal intensity as the air-blowing signal intensity.

10. The mobile terminal according to claim 6, wherein the preset property of the air-blowing signal comprises at least one of that:
a maximum intensity of low frequency signals is greater than an average intensity of high frequency signals and reaches a second preset threshold,
a mean square error of low frequency signal intensities is less than or equal to a third preset threshold, and
a maximum intensity of high frequency signals is less than or equal to a fourth preset threshold.

11. The mobile terminal according to claim 6, further comprising:
a touchscreen display;
one or more processors; and
a memory having one or more programs stored thereon, the one or more programs being executed by the one or more processors and comprising:
the sensor module,
the acquiring module comprising the processing unit, the division unit, the identification unit and the acquiring unit, and
the processing module.

12. A graphical user interface used in the mobile terminal according to claim 6.

13. A non-transitory computer readable storage medium, comprising:

one or more programs stored thereon, wherein, when being executed, the one or more programs cause one or more processors of a terminal device to execute an image processing method, and the method comprises:
collecting an audio signal using a sensor of the mobile terminal;
performing a windowed fast Fourier transform (FFT) on the audio signal to obtain a frequency domain signal of the audio signal;
dividing the frequency domain signal of the audio signal into at least one time-slice frequency domain signal;
identifying whether the audio signal is an air-blowing signal according to the at least one time-slice frequency domain signal and a preset property of the air-blowing signal; and
acquiring an air-blowing signal intensity according to the at least one time-slice frequency domain signal when the audio signal is identified as an air-blowing signal;
determining whether a specified to-be-processed area in an image is selected;
processing, according to the air-blowing signal intensity, the specified to-be-processed area when the specified to-be-processed area in the image is selected, and the entire image when no specified to-be-processed area in the image is selected, wherein processing according to the air-blowing signal intensity comprises:
acquiring an image processing parameter according to the air-blowing signal intensity and according to a preset correspondence relationship between the air-blowing signal intensity and an image processing parameter, and
processing, according to the image processing parameter, the specified to-be-processed area when the specified to-be-processed area in the image is selected, and the entire image when no specified to-be-processed area in the image is selected; and
disposing an air-blowing tool on the image, wherein a disposed location of the air-blowing tool indicates a value of the image processing parameter.

14. The computer readable storage medium according to claim 13, wherein the step of identifying whether the audio signal is the air-blowing signal according to the at least one time-slice frequency domain signal and the preset property of the air-blowing signal comprises:
identifying, according to each time-slice frequency domain signal among the at least one time-slice frequency domain signal and the preset property of the air-blowing signal, whether the time-slice frequency domain signal is an air-blowing signal;
determining a proportion of time-slice frequency domain signals that are air-blowing signals among the at least one time-slice frequency domain signal;
determining whether the proportion of the time-slice frequency domain signals that are air-blowing signals among the at least one time-slice frequency domain signal is greater than or equal to a first preset threshold; and
determining, when the proportion of the time-slice frequency domain signals that are air-blowing signals among the at least one time-slice frequency domain signal is greater than or equal to the first preset threshold, that the audio signal is the air-blowing signal; or otherwise, determining that the audio signal is not the air-blowing signal.

15. The computer readable storage medium according to claim 13, wherein after the step of collecting the audio signal and before the step of performing windowed fast Fourier transform (FFT) on the audio signal to obtain the frequency domain signal of the audio signal, the method further comprises:
performing a smoothing processing and an equalization processing on the audio signal.

16. The computer readable storage medium according to claim 15, wherein the step of acquiring the air-blowing signal intensity according to the at least one time-slice frequency domain signal comprises:
acquiring an average signal intensity of each time-slice frequency domain signal among the at least one time-slice frequency domain signal to obtain at least one average signal intensity; and
using an average value of the at least one average signal intensity as the air-blowing signal intensity.

17. The computer readable storage medium according to claim 13, wherein the preset property of the air-blowing signal comprises at least one of that:
a maximum intensity of low frequency signals is greater than an average intensity of high frequency signals and reaches a second preset threshold;
a mean square error of low frequency signal intensities is less than or equal to a third preset threshold; and
a maximum intensity of the high frequency signals is less than or equal to a fourth preset threshold.

* * * * *